United States Patent [19]
Maekawa

[11] Patent Number: 6,042,945
[45] Date of Patent: Mar. 28, 2000

[54] LIGHT DIFFUSING LAMINATED RESIN SHEET

[75] Inventor: Tomohiro Maekawa, Niihama, Japan

[73] Assignee: Sumitomo Chemical Company Limited, Osaka, Japan

[21] Appl. No.: 09/163,191

[22] Filed: Sep. 30, 1998

[30] Foreign Application Priority Data

Oct. 2, 1997 [JP] Japan .................................. 9-270104

[51] Int. Cl.⁷ ....................................................... B32B 9/04
[52] U.S. Cl. .......................................................... 428/411.1
[58] Field of Search .......................................... 428/411.1

[56] References Cited

U.S. PATENT DOCUMENTS

| | | | |
|---|---|---|---|
| 3,919,450 | 11/1975 | Shimizu | 428/307 |
| 3,928,099 | 12/1975 | Ohotsubo | 156/83 |
| 5,364,696 | 11/1994 | Wagner | 428/318.6 |

FOREIGN PATENT DOCUMENTS

| | | |
|---|---|---|
| 8-198976 | 8/1996 | Japan . |
| 9-208789 | 9/1997 | Japan . |

*Primary Examiner*—Paul R. Michl
*Attorney, Agent, or Firm*—Pillsbury Madison & Sutro LLP

[57] ABSTRACT

The present invention provides a light diffusing laminated resin sheet produced by laminating a resin layer (B) on at least one surface of a resin layer (A), the resin layer (A) being made by dispersing uniformly 0.1 to 10 parts by weight of a light diffusing agent having a weight-average particle size from 1 to 10 $\mu$m into 100 parts by weight of a base resin comprising 100 parts by weight of a methyl methacrylate resin or styrene resin and 0 to 30 parts by weight of a rubber-like polymer, and the resin layer (B) being made by dispersing uniformly 3 to 70 parts by weight of a rubber-like polymer into 100 parts by weight of a methyl methacrylate resin or styrene resin and essentially containing no inorganic particle dispersed.

This light diffusing laminated resin plate has excellent face impact resistance and high Young's modulus in flexure with light diffusing property, therefore, is preferably used for lighting covers, light diffusing sheets on the surface of liquid crystal layer of displays, illumination sign boards and the like.

8 Claims, No Drawings

LIGHT DIFFUSING LAMINATED RESIN SHEET

BACKGROUND OF THE INVENTION

1. Field of the Invention

The present invention relates to a light diffusing laminated resin sheet having excellent face impact resistance and high Young's modulus in flexure.

This laminated resin sheet is suitably used for lighting covers, light diffusing sheets on the surface of the liquid crystal layer of a display, illumination sign boards and the like.

2. Description of the Related Art

Usually, for imparting light diffusing property to a methyl methacrylate resin and styrene resin, there are added fine particles of inorganic material or polymer material having different refractive index from those of the methyl methacrylate resin and styrene resin which are base materials.

Thus obtained resin sheets having light scattering property are often used for lighting covers, illumination signboards and light diffusing sheets on the surface of the liquid crystal layer of a display.

These resin sheets are sometimes required to have excellent impact resistance, particularly excellent face impact resistance depending on the use, because these resin sheets are sometimes cracked.

For improving face impact resistance, for example, Japanese Patent Application Laid-Open (JP-A) No. 8-198,976 discloses a technology for allowing a rubber component to be contained in a light diffusing resin sheet.

Recently, resin materials having light diffusing property are often molded at high draw magnification particularly in the field of a lighting cover. With the development in molding technology, the protruded portion at corner of a lighting cover becomes large and the thickness of a lighting cover does not increase so much, therefore, there occurs a problem that a lighting cover is broken in manufacturing and transportation.

The light diffusing resin sheet described in JP-A No. 8-198,976 has a defect that a lot of rubber components should be contained for improving face impact resistance, leading to a disadvantage in cost and decrease in the Young's modulus in flexure of the resin sheet, therefore, the sheet is not suitable for a large molded article.

The present inventors have intensively studied about a light diffusing resin sheet having excellent face impact resistance. As a result, the present inventors have found that a light diffusing resin sheet having excellent face impact resistance and high Young's modulus in flexure can be obtained by laminating a resin layer into which a light diffusing agent is dispersed and a resin layer into which a specific impact resistance component. Thus the present invention has been accomplished.

SUMMARY OF THE INVENTION

An object of the present invention is to provide a light diffusing laminated resin sheet having excellent face impact resistance and high Young's modulus in flexure.

That is, present invention is a light diffusing laminated resin sheet produced by laminating a resin layer (B) on at least one surface of a resin layer (A), the resin layer (A) being made by dispersing uniformly 0.1 to 10 parts by weight of a light diffusing agent having a weight-average particle size from 1 to 10 μm into 100 parts by weight of a base resin comprising 100 parts by weight of a methyl methacrylate resin or styrene resin and 0 to 30 parts by weight of a rubber-like polymer, and the resin layer (B) being made by dispersing uniformly 3 to 70 parts by weight of a rubber-like polymer into 100 parts by weight of a methyl methacrylate resin or styrene resin and essentially dispersing no inorganic particle.

DETAILED DESCRIPTION OF THE INVENTION

The methyl methacrylate resin in the present invention is a resin comprising 50% by weight or more of a methyl methacrylate polymer, and may also be a copolymer comprising 50% by weight or more of methyl methacrylate unit and a monofunctional unsaturated monomer unit as a constituent unit.

Examples of the monofunctional unsaturated monomer unit which is copolymerizable with methyl methacrylate are methacrylates such as ethyl methacrylate, butyl methacrylate, cyclohexyl methacrylate, phenyl methacrylate, benzyl methacrylate, 2-ethylhexyl methacrylate, 2-hydroxyethyl methacrylate and the like; acrylates such as methyl acrylate, ethyl acrylate, butyl acrylate, cyclohexyl acrylate, phenyl acrylate, benzyl acrylate, 2-ethylhexyl acrylate, 2-hydroxyethyl acrylate and the like; unsaturated acids such as methacrylic acid, acrylic acid and the like; styrene, α-styrene, acrylonitrile, methacrylonitrile, maleic anhydride, phenylmaleimide, cyclohexylmaleimide, and the like.

Further, this copolymer may also contain a glutaric anhydride unit, glutarimide unit.

The styrene resin is a resin comprising 50% by weight or more of a styrene polymer, and may also be a copolymer comprising 50% by weight or more styrene unit and a monofunctional unsaturated monomer unit as a constituent unit.

As the monofunctional unsaturated monomer unit which is copolymerizable with styrene, the above-mentioned monomers excepting styrene are listed in addition to methyl methacrylate.

The rubber-like polymer in the present invention is an acrylic polymer having multilayer structure, or a graft copolymer obtained by graft-polymerizing 5 to 80 parts by weight of a rubber with 95 to 20 parts by weight of an ethylenically unsaturated monomer, particularly an acrylic unsaturated monomer and the like.

The acrylic polymer having multilayer structure has 20 to 60 parts by weight of a layer of an elastomer as an inner component, and has a hard layer as an outermost layer, and may also further contain a hard layer as an innermost layer.

The layer of an elastomer means a layer of an acrylic polymer which have a glass transition temperature (Tg) of less than 25° C. and comprises a polymer obtained by cross-linking at least one monoethylenically unsaturated monomer such as a lower alkylacrylate, lower alkyl methacrylate, lower alkoxy acrylate, cyanoethyl acrylate, acrylamide, hydroxy lower alkyl acrylate, hydroxy lower alkyl methacrylate, acrylic acid, methacrylic acid with a polyfunctional monomer.

The polyfunctional monomer means a monomer which can be copolymerized with the above-mentioned monoethylenically unsaturated monomers, and excludes conjugated dienes.

Examples of the polyfunctional monomer are alkyldiol di(meth)acrylates such as 1,4-butanediol di(meth)acrylate and neopentyl glycol di(meth)acrylate; alkylene glycol di(meth)acrylates such as ethylene glycol di(meth)acrylate, diethylene glycol di(meth)acrylate, tetraethylene glycol di(meth)acrylate, propylene glycol di(meth)acrylate and tetrapropylene glycol di(meth)acrylate; aromatic polyfunctional monomers such as divinylbenzene and diallyl phthalate; polyhydric alcohol (meth)acrylates such as trimethylolpropane tri(meth)acrylate and pentaerythritol tetra(meth)acrylate, and allyl methacrylates, and the like.

These monomers may be used in combination of two or more.

The hard layer is a layer of an acrylic polymer which have Tg of 25° C. or more, and comprises a polymer of an alkyl methacrylate having an alkyl group having 1 to 4 carbon atoms or a copolymer of this alkyl methacrylate with a copolymerizable monofunctional monomer such as another alkyl methacrylate, alkyl acrylate, styrene, substituted styrene, acrylonitrile, methacrylonitrile and the like. It may also be a cross-linked polymer obtained by further adding a polyfunctional monomer and polymerizing them.

Examples of the acrylic polymer having multi-layer structure are those described in Japanese Patent Application Publication (JP-B) No. 55-27,576, JP-A Nos. 6-80,739 and 49-23,292.

Examples of a rubber in the graft copolymer mentioned above are diene rubber such as polybutadiene rubber, acrylonitrile-butadiene copolymer rubber, styrene-butadiene copolymer rubber and the like, acrylic rubber such as polybutyl acrylate, polypropyl acrylate, poly-2-ethylhexyl acrylate and the like, and ethylene-propylene-non-conjugated diene rubber, and the like.

Examples of the ethylenic monomers used for graft-polymerizing this rubber are styrene, acrylonitrile, alkyl (meth)acrylate and the like.

As this graft copolymer, those described in JP-A No. 55-147,514 and JP-B No. 47-9,740 can be used.

The amount of the rubber-like polymer dispersed in the resin layer (A) is from 0 to 30 parts by weight, preferably from 3 to 20 parts by weight based on 100 parts by weight of the methyl methacrylate resin or styrene resin. When this amount is over 30 parts by weight, the Young's modulus in fluxure of a sheet lowers.

The light diffusing agent in the present invention is fine inorganic or resin transparent particles having different refractive index from those of the methyl methacrylate resin and styrene resin.

Examples of inorganic particles are calcium carbonate, barium sulfate, titanium oxide, aluminum hydroxide, silica, glass, talc, mica, white carbon, magnesium oxide, zinc oxide and the like, and particles obtained by surface treatment of these inorganic particles with organic materials.

Examples of resin particle are a cross-linked styrene resin particles, styrene resin particles having high molecular weight, cross-linked methyl methacrylate resin particles, methyl methacrylate resin particles having high molecular weight, cross-linked siloxane particles, and the like.

The refractive index of the light scattering agent in the present invention preferably has a difference in terms of absolute value of 0.02 to 0.13 from the refractive index of a base resin. When it is less than 0.02, a lot of particles added are required for imparting suitable light diffusing property, and when over 0.13, the property of hiding lamp image and the like tends to lower in producing a sheet having high transparency.

The particle size of the light diffusing agent in terms of weight-average particle size is from 1 to 10 $\mu$m, and preferably from 2 to 7 $\mu$m. When it is less than 1 $\mu$m, hiding property lowers, and when over 10 $\mu$m, a light diffusing agent should be dispersed in large amount for obtaining suitable light diffusing property, and further the face impact resistance of a resin sheet lowers.

The light diffusing agents are, alone or in combination of two or more, dispersed in an amount from 0.1 to 10 parts by weight based on 100 parts by weight of a base resin containing the rubber-like polymer in the resin layer (A). When the amount is less than 0.1 part by weight, light diffusing property is not sufficient, and when over 10 parts by weight, the face impact resistance of a resin sheet lowers.

The amount of the rubber-like polymer to be dispersed into the resin layer (B) is from 3 to 70 parts by weight based on 100 parts by weight of the methyl methacrylate resin or styrene resin, and when the rubber-like polymer is contained in larger amount in the resin layer (B) than in the resin layer (A), the face impact resistance is improved remarkably.

The ratio of the amount of the rubber-like polymers dispersed into the methyl methacrylate resin or styrene resin in the resin layer (A) to the amount of the rubber-like polymers dispersed into the methyl methacrylate resin or styrene resin in the resin layer (B) is preferably from 1:1.1 to 1:20.

When the amount of the rubber-like polymer dispersed into the methyl methacrylate resin or styrene resin in the resin layer (B) is less than 3 parts by weight, the effect of improving face impact resistance can not easily obtained, and when it is over 70 parts by weight, the surface of the resin sheet is softened, and easily scratched in manufacturing, transportation and processing.

In the resin layer (A) and the resin layer (B), public-known additives which can be dissolved into the resin in each layer are dispersed without specific problems in addition to the above-described materials, and further, they can be dispersed not only alone but also in combination of two or more for imparting the function.

Examples of these additives are a dye, optical stabilizer, ultraviolet absorber, antioxidant, releasing agent, flame retardant, anti-electrostatic agent and the like It should be avoided that an inorganic particle is dispersed in the resin layer (B) for imparting light scattering property, frosting property, rigidity and heat resistance.

Examples of this inorganic particle are calcium carbonate, barium sulfate, titanium oxide, aluminum hydroxide, silica, glass, talc, mica, white carbon, magnesium oxide, zinc oxide, glass hollow article, carbon fiber, glass fiber and the like.

Though these inorganic particles can be dispersed in the resin layer (A) for imparting function, when these inorganic particles are dispersed in the resin layer (B) even in small amount, the face impact resistance lowers.

Essential no dispersion herein referred to means that the amount of the inorganic particle is 0.1 part by weight or less based on 100 parts by weight of the base resin containing the rubber-like polymer.

The surface of the recent light diffusing sheet is often in matted condition as represented by lighting covers, and also in the surface of the light diffusing laminated resin sheet of the present invention, the matting is fully possible.

The matting is accomplished by dispersing an insoluble resin particle having specific size in specific amount into a resin layer of which luster is to be extinguished and extruding them in extrusion molding, by transferring unevenness by a roll after lamination, and by transferring unevenness by a cell in producing a matted surface in casting polymerization.

The insoluble resin particle herein referred to is a resin particle having composition similar to that of the resin layer into which the resin particle is dispersed, and specifically, is a methyl methacrylate resin particle having cross-linked structure or methyl methacrylate resin particle having high molecular weight in the case when the resin layer is comprising of a methyl methacrylate resin, and is a styrene resin particle having cross-linked structure or styrene resin particle having high molecular weight in the case when the resin layer is comprising of styrene resin.

When the compositions of the resin layer and the insoluble resin particle much differ here, there is a fear that the face impact resistance is lowered, therefore, sufficient attention should be paid to the combination thereof.

The unevenness which is to be imparted to the surface of the resin layer is desirably less than 50 µm in terms of the 10 points average roughness (Rz) described in JIS-B0601. When the insoluble resin particle is to be dispersed, the above-mentioned unevenness level is obtained after extrusion molding if a particle having a weight-average particle size from 10 to 50 µm is dispersed in an amount from 3 to 20 parts by weight based on 100 parts by weight of the base resin containing the rubber-like polymer.

When the 10 points average roughness is over 50 µm, the resin layer is easily cracked when load is applied on the surface.

Also regarding the particle size and the amount of the insoluble resin particle dispersed, when it is out of the above-mentioned value range, the face impact resistance is lowered.

The thickness of the light diffusing laminated resin sheet is not particularly restricted, however, is preferably in the range from 0.1 to 10 mm.

The layer thickness ratio (resin layer (A)/resin layer (B)) is in the range from 99/1 to 1.1/1. When the resin layer (B) covers the both surfaces of the resin layer (A), the layer thickness ratio (resin layer (B)/resin layer (A)/resinlayer (B)) is in the range from 1/198/1 to 1/2.2/1.

For preparing a composition in which the rubber-like polymer and light diffusing agent are dispersed in the methyl methacrylate or styrene resin, public-known methods can be applied. Namely, there is a method in which these components are mechanically mixed by a Henschel mixer, tumbler mixer and the like, and melted and kneaded by a Banbury mixer or single screw or twin screw extruder. Further, it is also possible to make a laminated resin sheet in one step using the multilayer-extrusion molding method and the casting polymerization method described below.

For making a light diffusing laminated resin plate from the resulted composition, public-known methods are used. For example, a multilayer-extrusion molding method, film lamination method, heat press method, solvent adhesion method, polymerization adhesion method, casting polymerization method, surface coating method and the like are used.

The multilayer-extrusion molding method is a method in which a compositions of the resin layer (A) and the resin layer (B) are melted and kneaded by two or three single or twin screw extruders, then, the compositions are laminated through a feed block die or multi manifold die, and a laminated melted resin sheet is cooled for solidification using a roll unit to obtain a laminated resin sheet.

The film lamination method is a method in which one of compositions is previously subjected to film processing, and other layer is made into a melted resin layer by an extrusion method, and then the both layer are laminated by pushing.

The heat press method is a method in which compositions of both layers are previously subjected to sheet or film processing, and they are pressed at higher temperature than the heat distortion temperatures of both layers for integration.

The solvent adhesion method is a method in which both compositions are previously subjected to sheet or film processing, and adhesion property is imparted to the surfaces of layers by using a solvent which dissolves either one or both layers and they are adhered.

The polymerization adhesion method is a method in which a polymerization adhesive prepared by adding a polymerization initiator which initiated radical polymerization by heat or light to a monomer which is a raw material of any of the resins constituting two layers is allowed to exist between the both layers, and polymerization is conducted simultaneously with lamination of the both layer by effecting heating or light irradiation.

The casting polymerization method is a method in which one of layers is previously subjected to sheet or film processing, this is placed on one surface of a cell for casting molding, and into this cell is poured a mixture of a monomer or partial polymer forming the other layer and light diffusing agent, optionally rubber-like polymer, and the mixture is polymerized.

The surface coating method is a method in which a sheet or film of a layer having larger thickness is previously formed, a mixture of a monomer or partial polymer forming other layer and an optional additive is coated onto this sheet or film, and the mixture is polymerized and solidified by heat or irradiation with a ultraviolet ray.

The light diffusing laminated resin sheet of the present invention has excellent face impact resistance and high Young's modulus in flexure with light diffusing property, and is preferably used for lighting covers, light diffusing sheets on the surface of liquid crystal layer of displays, illumination sign boards and the like.

EXAMPLES

The following examples further illustrate the present invention, but do not limit the scope thereof.

Extrusion apparatuses used in the examples are as follows.

Extruder ①: screwdiameter40 mm, singlescrew, with bent (manufactured by Tanabe Plastics Machinery Co., Ltd.)

Extruder ②: screw diameter 20 mm, single screw, with bent (manufactured by Tanabe Plastics Machinery Co., Ltd.)

Feed block: two kinds three layer distribution (manufactured by Tanabe Plastic Machinery Co., Ltd.)

Die: T die, lip width 250 mm, lip distance 6 mm

Roll: Three polishing rolls, vertical type

The evaluation methods are as follows.

(1) Weight-average particle size

It was measured by a particle size analyzer (micro track particle size analyzer Model 9220 FRA, manufactured by Leed & Northrup Ltd.), and $D_{50}$ value was adopted as an average particle size.

(2) Total light transmittance (Tt)

It was measured by a Haze & transmittance measuring machine (HR-1 00, manufactured by Murakami Shikisai Gijutsu Kenkyusho Corp.) according to JIS K-7105.

(3) Hiding property and light diffusing property

The light was vertically irradiated to the surface of the light diffusing laminated resin sheet, and transmitted light strength ($I_0$) at a transmission angle of 0° to the normal line, transmitted light strength ($I_5$) at a transmission angle of 5° to the normal line and transmitted light strength ($I_{70}$) at a transmission angle of 700 to the normal line were measured by using light strength measuring machine (GP-1R, manufactured by Murakami Shikisai Gijutsu Kenkyusho Corp.), and $I_5/I_0$ was regarded as the index of hiding property and $I_{70}/I_0$ was regarded as the index of light diffusing property.

(4) Young's modulus in flexure

Young's modulus in flexure was measured by using an automatic bending tester (AG-500C, manufactured by Shimadzu Corp.) according to JIS Z-7203.

(5) Face impact resistance

A sample which had been cut out in the form of a 5 cm square was maintained under conditions of 23° C. and 50% relative humidity for 24 hours, then, falling weight test was carried out using a falling weight type ¼ inch and load of 300 g by a Dupont falling weight tester (Y.S.S. Tester, manufactured by Yasuda Seiki Seisakusho Corp.) in the same atmosphere.

A weight was fallen on the sample from the height previously set, and the most long length of a crack generated was measured. The height was changed every 5 cm, and the measurement was conducted 5 times in each height by changing the sample.

An average cracked length was calculated in each height, and an average height in which an average cracked length was 1.5 cm was calculated This average height was regarded as the index of face impact resistance.

(6) Confirmation of layer thickness

The end surface of the resulted laminated extruded sheet was observed with a ×15 magnifier, and the thickness of the laminated was confirmed Reference Example 1

[Production of rubber-like polymer]

An acrylic polymer having three-layer structure was produced according to a method described in the example of JP-B No. 55–27,576.

Into a glass reaction vessel having an inner volume of 5 L was charged 1700 g of ion-exchanged water, 0.7 g of sodium carbonate and 0.3 g of sodium persulfate, and the mixture was stirred under nitrogen flow, and after 4.46 g of an emulsifier (Pellex OT-P: manufactured by Kao Corp.) 150 g of ion-exchanged water, 150 g of methyl methacrylate and 0.3 g of allyl methacrylate were charged, the mixture was heated up to 75° C. and stirred for 150 minutes.

Then, to this was added a mixture of 689 g of butyl acrylate, 162 g of styrene and 17 g of allyl methacrylate and a mixture of 0.85 g of sodium persulfate, 7.4 g of an emulsifier (Pellex OT-P: manufactured by Kao Corp.) and 50 g of ion-exchanged water via separate inlets over 90 minutes and the resulted mixture was further polymerized for 90 minutes.

After completing the polymerization, a mixture of 326 g of methyl acrylate and 14 g of ethyl acrylate and 30g of ion-exchanged water into which 0.34 g of sodium persulfate had been dissolved were added via separate inlets over 30 minutes. After completing the addition, the mixture was kept for further 60 minutes to complete the polymerization.

The resulted latex was added into a 0.5% aqueous aluminum chloride solution to flocculate a polymer. This polymer was washed five times with hot water, and dried to obtain an acrylic polymer having three-layer structure.

Examples 1 and Comparative Examples 1 to 3

[Resin layer (A)]

100 parts by weight of a methyl methacrylate resin (Sumipex EXA, refractive index 1.49, manufactured by Sumitomo Chemical Co., Ltd.) and a light diffusing agent of the kind and in the amount shown in Table 1 were mixed by a Henschel mixer, then, the mixture was melt and kneaded by the extruder ① and fed to a feed block.

[Resin layer (B)]

Particles of the kind and the amount shown in Table 2 was mixed by a Henschel mixer with 100 parts by weight of a mixture obtained by mixing the same methyl methacrylate resin as used in the resin layer (A) and the rubber-like polymer produced in Reference Example 1 in amounts shown in Table 1 respectively, then, the mixture was melt and kneaded by the extruder ② and fed to a feed block.

[Laminated resin sheet]

Multilayer-extrusion molding of three-layer constitution of 0.1 mm/1.8 mm/0.1 mm was conducted using the resin layer (A) as an intermediate layer and the resin layers (B) as surface layers at an extrusion resin temperature of 265° C., to produce a laminated resin sheet having a width of 22 cm.

The evaluation results are shown in Table 3.

Example 2 and Comparative Example 4

In the same manner as in Example 1, multilayer-extrusion molding of three-layer constitution of 0.1 mm/1.8 mm/0.1 mm was conducted using the resin layer (A) having composition shown in Table 1 or 2 as an intermediate layer and the resin layers (B) having composition shown in Table 1 or 2 as surface layers at an extrusion resin temperature of 265° C., to produce a laminated resin sheet having a width of 22 cm.

The evaluation results are shown in Table 3.

Example 3 and Comparative Example 5

In the same manner as in Example 1, multilayer-extrusion molding of three-layer constitution of 0.2 mm/3.6 mm/0.2 mm was conducted using the resin layer (A) having composition shown in Table 1 or 2 as an intermediate layer and the resin layers (B) having composition shown in Table 1 or 2 as surface layers at an extrusion resin temperature of 265° C., to produce a laminated resin sheet having a width of 20 cm.

The evaluation results are shown in Table 3.

Example 4

In the same manner as in Example 1, multilayer-extrusion molding of three-layer constitution of 0.15 mm/2.7 mm/0.15 mm was conducted using the resin layer (A) having composition shown in Table 1 or 2 as an intermediate layer and the resin layers (B) having composition shown in Table 1 or 2 as surface layers at an extrusion resin temperature of 265° C., to produce a laminated resin sheet having a width of 20 cm.

The evaluation results are shown in Table 3.

Comparative Example 6

1.6 parts by weight of the same light diffusing agent as used in Example 4 and 9 parts by weight of the cross-linked methyl methacrylate particle used in Example 3 were mixed by a Henschel mixer with 100 parts by weight of a mixture obtained by mixing 100 parts by weight of the same methyl methacrylate resin as used in Example 1 and 25 parts by weight of the rubber-like polymer produced in Reference Example 1, then, the mixture was melt and kneaded by the extruder ① and a monolayer resin sheet having a thickness of 3 mm and a width of 20 cm was made at an extrusion resin temperature of 265° C.

The evaluation results are shown in Table 3.

Examples 5 to 6

In the same manner as in Example 1, multilayer-extrusion molding of three-layer constitution of 0.3 mm/2.4 mm/0.3 mm was conducted using the resin layer (A) having composition shown in Table 1 or 2 as an intermediate layer and the resin layers (B) having composition shown in Table 1 or 2 as surface layers at an extrusion resin temperature of 265° C., to produce a laminated resin sheet having a width of 20 cm.

The evaluation results are shown in Table 3.

TABLE 1

| | Resin layer (A) | | | | |
|---|---|---|---|---|---|
| | Resin | | | | |
| | | Rubber- | Light diffusing agent | | |
| | PMMA (parts) | like polymer (parts) | Kind | Particle size (μm) | Amount of dispersion (parts) |
| Example 1 | 100 | 0 | CaCO$_3$* | 3 | 3 |
| Comparative example 1 | 100 | 0 | — | — | — |
| Comparative example 2 | 100 | 0 | GF | 70 | 3 |
| Comparative example 3 | 100 | 0 | CaCO$_3$* | 3 | 3 |
| Example 2 | 100 | 14 | CaCO$_3$* | 3 | 3 |
| Comparative example 4 | 100 | 14 | CaCO$_3$* | 3 | 3 |
| Example 3 | 100 | 14 | CaCO$_3$* | 3 | 1.6 |
| Comparative example 5 | 100 | 14 | CaCO$_3$# | 11 | 2.4 |
| Example 4 | 100 | 14 | CaCO$_3$* | 5 | 1.6 |
| Example 5 | 100 | 10 | CaCO$_3$* | 5 | 1.6 |
| Example 6 | 100 | 10 | CaCO$_3$* | 5 | 1.6 |

PMMA: methyl methacrylate resin
CaCO$_3$*: manufactured by Maruo Calcium Co., Ltd. (refractive index 1.61)
CaCO$_3$ #: manufactured by Sipro Kasei Co., Ltd. (refractive index 1.61)
GF: glass fiber of longer diameter 70 μm/shorter diameter 14 μm (refractive index 1.54)
parts: parts by weight

TABLE 2

| | Resin layer (B) | | | | |
|---|---|---|---|---|---|
| | Resin | | | | |
| | | Rubber- | Light diffusing agent | | |
| | PMMA (parts) | like polymer (parts) | Kind | Particle size (μm) | Amount of dispersion (parts) |
| Example 1 | 100 | 39 | — | 11 | — |
| Comparative example 1 | 100 | 30 | — | — | — |
| Comparative example 2 | 100 | 39 | — | — | — |
| Comparative example 3 | 100 | 39 | CaCO$_3$# | 11 | 0.3 |
| Example 2 | 100 | 39 | — | — | — |
| Comparative example 4 | 100 | 0 | — | — | — |
| Example 3 | 100 | 39 | PMMA cross-linked | 35 | 9 |
| Comparative example 5 | 100 | 39 | PMMA cross-linked | 35 | 9 |
| Example 4 | 100 | 39 | PMMA cross-linked | 35 | 9 |
| Example 5 | 100 | 14 | PMMA cross-linked | 35 | 9 |
| Example 6 | 100 | 25 | PMMA cross-linked | 35 | 9 |

PMMA: methyl methacrylate resin
CaCO$_3$ #: manufactured by Sipro Kasei Co., Ltd. (refractive index 1.61)
PMMA cross-linked: Sumipex XCIA, manufactured by Sumitomo Chemical Co., Ltd. (refractive index 1.49)
parts: parts by weight

TABLE 3

| | Layer constitution (mm) | Tt (%) | Hiding property | Light diffusing property | Young's modulus in fluxure (Mpa) | Face impact resistance (cm) |
|---|---|---|---|---|---|---|
| Example 1 | 0.1/1.8/0.1 | 56 | 0.99 | 0.25 | 3300 | 9 |
| Comparative | 0.1/1.8/0.1 | 92 | 0 | 0 | 3200 | 7 |

TABLE 3-continued

|  | Layer constitution (mm) | Tt (%) | Hiding property | Light diffusing property | Young's modulus in fluxure (Mpa) | Face impact resistance (cm) |
|---|---|---|---|---|---|---|
| example 1 |  |  |  |  |  |  |
| Comparative example 2 | 0.1/1.8/0.1 | 80 | 0.13 | 0.00 | 3600 | 6 |
| Comparative example 3 | 0.1/1.8/0.1 | 56 | 0.99 | 0.25 | 3300 | 7 |
| Example 2 | 0.1/1.8/0.1 | 55 | 0.99 | 0.25 | 3000 | 20 |
| Comparative example 4 | 0.1/1.8/0.1 | 55 | 0.99 | 0.25 | 3100 | 6 |
| Example 3 | 0.2/3.6/0.2 | 36 | 0.99 | 0.28 | 2800 | 99 |
| Comparative example 5 | 0.2/3.6/0.2 | 34 | 0.99 | 0.28 | 2800 | 52 |
| Example 4 | 0.15/2.7/0.15 | 44 | 0.99 | 0.27 | 2800 | 40 |
| Comparative example 6 | 3 | 42 | 0.99 | 0.27 | 2500 | 28 |
| Example 5 | 0.3/2.4/0.3 | 41 | 0.99 | 0.27 | 2800 | 31 |
| Example 6 | 0.3/2.4/0.3 | 41 | 0.99 | 0.27 | 2700 | 33 |

What is claimed is:

1. A light diffusing laminated resin sheet produced by laminating a resin layer (B) on at least one surface of a resin layer (A), the resin layer (A) being made by dispersing uniformly 0.1 to 10 parts by weight of an inorganic light diffusing agent having a weight average particle size from 1 to 10 µm into 100 parts by weight of a base resin comprising 100 parts by weight of a methyl methacrylate resin or styrene resin and 0 to 30 parts by weight of a rubber-like polymer, and the resin layer (B) being made by dispersing uniformly 3 to 70 parts by weight of a rubber-like polymer into 100 parts by weight of a methyl methacrylate resin or styrene resin and essentially dispersing no inorganic particle.

2. The light diffusing laminated resin sheet according to claim 1, wherein the methyl methacrylate resin is a resin containing 50% by weight or more of a methyl methacrylate polymer or a copolymer comprising 50% by weight or more of methyl methacrylate unit and a monofunctional unsaturated monomer unit as a constituent unit.

3. The light diffusing laminated resin sheet according to claim 1, wherein the styrene resin is a resin containing 50% by weight or more of a styrene polymer or a copolymer comprising 50% by weight or more of styrene unit and a monofunctional unsaturated monomer unit as a constituent unit.

4. The light diffusing laminated resin sheet according to claim 1, wherein the rubber-like polymer is an acrylic polymer having multilayer structure or a graft copolymer obtained by graft-polymerizing 5 to 80 parts by weight of a rubber with 95 to 20 parts by weight of an acrylic unsaturated monomer.

5. The light diffusing laminated resin sheet according to claim 1, wherein the inorganic light diffusing agent is a fine inorganic particle having a different refraction index from those of the methyl methacrylate resin and styrene resin.

6. The light diffusing laminated resin sheet according to claim 1, wherein the light diffusing agent is calcium carbonate.

7. The light diffusing laminated resin sheet according to claim 1, wherein the ratio of the amount of the rubber-like polymer dispersed into the methyl methacrylate resin or styrene resin in the resin layer (A) to the amount of the rubber-like polymer dispersed into the methyl methacrylate resin or styrene resin in the resin layer (B) is from 1:1.1 to 1:20.

8. The light diffusing laminated resin sheet according to claim 1, wherein the method of lamination of the resin layers is a multilayer-extrusion molding method.

* * * * *